United States Patent
Huang et al.

(10) Patent No.: US 12,486,185 B2
(45) Date of Patent: Dec. 2, 2025

(54) METHOD FOR SIMULTANEOUSLY TREATING HIGH CONCENTRATION OF SULFIDE AND ORGANIC COMPOSITION CONTAINED IN WASTE LIQUID

(71) Applicant: CPC CORPORATION, TAIWAN, Kaohsiung (TW)

(72) Inventors: Yi-Fong Huang, Kaohsiung (TW); Shih-Yuen Chang, Kaohsiung (TW); Po-Jen Chiang, Kaohsiung (TW); I-Cheng Chou, Kaohsiung (TW); Mao-Yuan Tu, Kaohsiung (TW); Yih-Ping Wang, Kaohsiung (TW)

(73) Assignee: CPC CORPORATION, TAIWAN, Kaohsiung (TW)

(*) Notice: Subject to any disclaimer, the term of this patent is extended or adjusted under 35 U.S.C. 154(b) by 631 days.

(21) Appl. No.: 17/894,177

(22) Filed: Aug. 24, 2022

(65) Prior Publication Data
US 2023/0406744 A1 Dec. 21, 2023

(30) Foreign Application Priority Data
Jun. 20, 2022 (TW) ................... 111122826

(51) Int. Cl.
| C02F 9/00 | (2023.01) |
| C02F 1/32 | (2023.01) |
| C02F 1/66 | (2023.01) |
| C02F 1/72 | (2023.01) |
| C02F 3/00 | (2023.01) |
| C02F 101/10 | (2006.01) |

(52) U.S. Cl.
CPC ............... *C02F 9/00* (2013.01); *C02F 1/32* (2013.01); *C02F 1/66* (2013.01); *C02F 1/722* (2013.01); *C02F 1/727* (2013.01); *C02F 3/00* (2013.01); *C02F 2101/101* (2013.01); *C02F 2101/40* (2013.01); *C02F 2305/02* (2013.01)

(58) Field of Classification Search
None
See application file for complete search history.

(56) References Cited

U.S. PATENT DOCUMENTS

2013/0313199 A1* 11/2013 Marcin .................... C02F 9/00
210/182

FOREIGN PATENT DOCUMENTS

CN 110642457 A * 1/2020

OTHER PUBLICATIONS

MT CN 110642457 (Year: 2020).*

* cited by examiner

*Primary Examiner* — Peter Keyworth

(57) ABSTRACT

A method for treating a waste liquid comprises: step (A), adding a precursory oxidant to a waste liquid having a temperature of 25-70° C.; wherein, the precursory oxidant is hydrogen peroxide or sodium percarbonate, and in mg/L, a ratio of the precursory oxidant/the total amount of sulfide is 2.20 to 6.37; step (B), mixing an advanced oxidant and the waste liquid after step (A); wherein, the advanced oxidant is sodium persulfate or potassium persulfate, and in mg/L, a ratio of the advanced oxidant/COD after step (A) is 7.63 to 33.27; step (C), using UV illumination method to illuminate the oxidant dissolved in the waste liquid after step (B), and aerated with oxygen-containing gas. By the above-described method, it can achieve the purpose of sulfide conversion and degradation and removal of organic pollution composition under the condition free of the generation of $H_2S$.

8 Claims, 9 Drawing Sheets

```
┌─────────────────────────────────────────────┐
│ adding a precursory oxidant or the precursory oxidant
│ accompanied by aerating with oxygen-containing gas to
│ a waste liquid containing a high concentration of
│ sulfide and COD having a temperature of 25-70°C, and     ─ A
│ make it mixed thoroughly and evenly; wherein, the
│ precursory oxidant is hydrogen peroxide or sodium
│ percarbonate, and in mg/L, a ratio of the precursory
│ oxidant/the total amount of sulfide is 2.20 to 6.37
└─────────────────────────────────────────────┘
                      ↓
┌─────────────────────────────────────────────┐
│ sufficiently mixing evenly an advanced oxidant
│ and the waste liquid after treatment in the above
│ step (A); wherein, the advanced oxidant is sodium         ─ B
│ persulfate or potassium persulfate, and in mg/L, a
│ ratio of the advanced oxidant/COD after the
│ above step (A) is 7.63 to 33.27
└─────────────────────────────────────────────┘
                      ↓
┌─────────────────────────────────────────────┐
│ using UV illumination method to illuminate the
│ oxidant dissolved in the waste liquid after the above
│ step (B) or UV light to illuminate together with the      ─ C
│ residual hydrogen peroxide and/or sodium
│ percarbonate in the waste liquid of the above step
│ (A), the oxidant dissolved in the waste liquid is
│ activated, and aerated with oxygen-containing gas
└─────────────────────────────────────────────┘
                      ↓
┌─────────────────────────────────────────────┐
│ recycling the waste liquid after the above steps (A)      ─ D
│ to (C) as a regenerative lye; or adjusting pH of the
│ waste liquid that has undergone the above step
│ (C), so that it is connected to a biological
│ treatment unit or discharged directly as an effluent
└─────────────────────────────────────────────┘
```

FIG. 1

METHOD FOR SIMULTANEOUSLY TREATING HIGH CONCENTRATION OF SULFIDE AND ORGANIC COMPOSITION CONTAINED IN WASTE LIQUID

CROSS-REFERENCE TO RELATED APPLICATION

This non-provisional application claims priority under 35 U.S.C. § 119(a) on Patent Application No(s). 111122826 filed in Taiwan, R.O.C. on Jun. 20, 2022, the entire contents of which are hereby incorporated by reference.

BACKGROUND OF THE INVENTION

1. Field of the Invention

The present disclosure relates to a method and system for simultaneously treating a high concentration of sulfide and organic composition (COD) contained in a waste liquid, and in particular to a method and system for simultaneously treating a high concentration of sulfide and organic composition contained in a waste liquid without the generation of hydrogen sulfide acid gas during treatment.

2. Description of the Related Art

Hydrogen sulfide is an explosive gas that is highly toxic and corrosive, will have a significant impact on and harm to the environment, ecology, organisms and human health. In the traditional treatment of waste liquid containing sulfide, it is possible to produce hydrogen sulfide along with the treatment process. Further, the waste liquid containing sulfide (e.g., petrochemical industry waste lye, oil refinery industry waste lye) usually also contains organic composition, and the content of the above organic composition is expressed in chemical oxygen demand (COD).

In view of the treatment of the above-mentioned waste liquid containing sulfide and organic composition, the technology of wet air oxidation (WAO) has been proposed, which uses oxygen in the air to oxidize the sulfide and organic composition in the waste liquid.

BRIEF SUMMARY OF THE INVENTION

However, the above-described WAO method is usually carried out under certain conditions of high temperature and high pressure (e.g., 175 to 350° C., and 2.067 to 20.67 MPa), or under the action of a catalyst, oxygen in the air is used to oxidize the sulfide into thiosulfate or sulfate. Because of the high terminal temperature of a reactor used in this method, the material requirements for the reactor are very high, making it expensive to use the WAO method and difficult to be widely used.

Therefore, for the waste liquid containing sulfide and organic composition (or referred to as containing sulfide and COD), especially the waste liquid containing a high concentration of sulfide and organic composition, it is desired how to achieve easy operation, stable processing performance, high efficiency, low cost, and the most important thing is to be able to efficiently remove sulfide and organic composition, while the generation of hydrogen sulfide can be avoided, which is an important direction for future development and the primary purpose of the present disclosure.

To solve the above problem, an aspect of the present disclosure of a method for simultaneously treating a high concentration of sulfide and organic composition contained in a waste liquid comprises:
(A) step of sulfur removal by precursory stabilizing conversion (hereinafter referred to as step (A)), it is adding a precursory oxidant or the precursory oxidant accompanied by aerating with oxygen-containing gas to a waste liquid containing a high concentration of sulfide and COD having a temperature of 25-70° C., and make it mixed thoroughly and evenly; wherein, the precursory oxidant is hydrogen peroxide or sodium percarbonate, and in mg/L, a ratio of the precursory oxidant/the total amount of sulfide is 2.20 to 6.37;
(B) step of sulfur removal by advanced oxidative degradation (hereinafter referred to as step (B)), it is sufficiently mixing evenly an advanced oxidant and the waste liquid after treatment in the above step (A); wherein, the advanced oxidant is sodium persulfate or potassium persulfate, and in mg/L, a ratio of the advanced oxidant/COD after the above step (A) is 7.63 to 33.27;
(C) step of UV illumination (hereinafter referred to as step (C)), it is using UV illumination method to illuminate the oxidant dissolved in the waste liquid after the above step (B) or UV light to illuminate together with the residual hydrogen peroxide and/or sodium percarbonate in the waste liquid of the above step (A), the oxidant dissolved in the waste liquid is activated, and aerated with oxygen-containing gas.

In an embodiment, the method further comprises: (D) step of post-treatment (hereinafter referred to as step (D)), it is recycling the waste liquid after the step (C) as a regenerative lye; or adjusting pH of the waste liquid that has undergone the above step (C), so that it is connected to a biological treatment unit or discharged directly as an effluent.

In an embodiment, the sulfide comprises organic sulfides and inorganic sulfides, and the organic sulfide includes at least any one selected from the group consisting of thiols, thiophenols, thioethers, polysulfides, sulfones, cyclic sulfides, thio heterocyclic compounds, thioaldehydes, thioketones, and thiocarboxylic acids; the inorganic sulfide includes at least any one selected from the group consisting of NaHS, KHS, $Na_2S$, $K_2S$ and dissolved $H_2S$.

In an embodiment, in the step (C), the oxidant dissolved in the waste liquid after the step (B) is at least any one selected from the group consisting of sodium persulfate or potassium persulfate described in the step (B), hydrogen peroxide or sodium percarbonate remained in the step (A), and a mixture of the above two and oxygen-containing gas.

In an embodiment, in the step (C), a wavelength range of UV light in the UV illumination method is between 180 nm and 365 nm.

In an embodiment, a treatment time of the step (A) is 0.5 to 1 hour; a treatment time of the step (C) is 1.5 to 7 hours.

In an embodiment, a concentration of the sulfide is 20000-35000 mg/L; and a concentration of the COD is 25000-35000 mg/L.

In an embodiment, the waste liquid containing a high concentration of sulfide and COD is at least any one selected from the following: petrochemical industry waste lye; oil refinery industry waste lye; pharmaceutical waste water containing sulfides, tanning waste water, aquaculture waste water, domestic sewage or soil groundwater.

To solve the above problem, an aspect of the present disclosure of a system for simultaneously treating a high concentration of sulfide and organic composition contained in a waste liquid comprises: a reaction tank, used to accommodate a waste liquid containing a high concentration of sulfide and COD, and the step (A) and the step (B) are performed in the reaction tank; a photoactivation reaction unit, connected with the reaction tank in series, and receiving the waste liquid after passing through the reaction tank, and the step (C) is performed in the photoactivation reaction unit; an aeration unit, connected with the reaction tank and the photoactivation reaction unit in series, and used to be aerated with oxygen-containing gas.

In an embodiment, the system further comprises: an exhaust port, mounted at a top of the reaction tank.

By the above steps (A)-(C), the present disclosure induces a series of oxidation reaction additions to facilitate the stabilizing conversion of all sulfides and synchronous degradation of organic pollutants. The step (A) is led by a "non-free radical reaction" of hydrogen peroxide or sodium percarbonate (preferably further going with air/oxygen). The steps (B) and (C) are "free radical reaction" by persulfate (sodium persulfate or potassium persulfate) oxidant with aeration and activation of ultraviolet light illumination (UV wavelength of 180 nm to 365 nm), or further including the addition of UV photoactivation oxidation of the residual hydrogen peroxide or sodium percarbonate in the (A) step.

The step (A) forcibly converts the organic and inorganic sulfides in the waste water into a highly stable sulfate ion (at high alkalinity, most of the sulfides can complete the conversion in the step (A)) by the above-described hydrogen peroxide or sodium percarbonate; the step (B) and step (C) are continuous conversion addition to promote and advance the oxidative degradation of harmful pollutants, specifically, $SO_4^-\cdot$ and $HO\cdot$ and other free radicals produced after the activation of the above oxidants (the precursory oxidants and/or advanced oxidants) together with oxygen-containing gas continuously participates, that is, a strong and inhibitory reaction is produced in the oxygen-rich wastewater to eliminate the residue of any organic and inorganic sulfides and the possibility of the generation of $H_2S$ acid gas, and additional sufficient free radical species (such as $O_2^-\cdot$, $ROO\cdot$) are derived to make organic pollutants carry out oxidative degradation to be more harmless and smaller organic molecules (short carbon chain alcohols, such as methanol and ethanol, or short carbon chain acids, such as formic acid, acetic acid, and oxalic acid), and even achieve mineralization effects.

Further, the main reaction mechanisms of the step (A) include:

$$S^{2-}+4H_2O_2 \rightarrow SO_4^{2-}+4H_2O$$

$$HS^-+4H_2O_2 \rightarrow SO_4^{2-}+4H_2O+H^+$$

$$SR^-+4H_2O_2 \rightarrow SO_4^{2-}+3H_2O+ROH+H^+$$

And the promotion that oxygen is participated in the reaction:

$$S^{2-}+2O_2 \rightarrow SO_4^{2-}$$

$$HS^-+2O_2 \rightarrow SO_4^{2-}+H^+$$

$$SR^-+4H_2O_2+\tfrac{1}{2}O_2 \rightarrow SO_4^{2-}+3H_2O+ROOH+H^+$$

Additionally, when the initial pH value<10, it means that when there is doubt that the composition of the dissolved $H_2S(aq)$ has been contained in the waste liquid to be treated, the present method also has the ability to inhibit the generation of hydrogen sulfide gas, and the reaction mechanisms are:

$$H_2S_{(aq)}+4H_2O_2 \rightarrow SO_4^{2-}+4H_2O+2H^+$$

$$H_2S_{(aq)}+2O_2 \rightarrow SO_4^-+2H^+$$

Wherein, "R" is the organic structure of organic sulfide composition (such as NaSR), and "ROH" and "ROOH" are intermediate species of organic alcohols and intermediate species of organic acids derived from their oxidative degradation, respectively.

Next, the main reaction mechanisms of the steps (B) and (C) include: $O_2$ participates in $HO\cdot$ oxidative degradation and promotes sulfide conversion:

$$S^{2-}+\cdot OH+2O_2 \rightarrow SO_4^-+OH^-$$

$$S^{2-}+\cdot OH+\tfrac{1}{2}O_2 \rightarrow SO_4^{2-}+O_2^-+H^+$$

$$SR^-+\cdot OH+2O_2^- \rightarrow SO_4^-+ROH$$

$$SR^-+\cdot OH+\tfrac{1}{2}O_2 \rightarrow SO_4^-+ROOH$$

$$SR^-+\cdot OH+\tfrac{1}{2}O_2 \rightarrow SO_4^-+ROO\cdot+H^+$$

$$HS^-+\cdot OH+2O_2^- \rightarrow SO_4^-+H_2O$$

$$HS^-+\cdot OH+\tfrac{1}{2}O_2^- \rightarrow SO_4^{2-}+O_2^-+2H^+$$

Wherein, "$O_2^-\cdot$" and "$ROO\cdot$" are superoxide radicals derived from oxygen and organic matter in the degradation process, which belong to intermediate free radical species and can also promote the degradation of organic matter in the system.

Additionally, the regenerative mechanism of $H_2O_2$ is included:

$$HS^-+\cdot OH+\tfrac{1}{2}O_2 \rightarrow SO_4^-+H_2O_2$$

And $O_2$ participates in $SO_4^-$ oxidative degradation and promote sulfide conversion:

$$S^{2-}+SO_4^-+2O_2 \rightarrow SO_4^{2-}+SO_2+O_2^-$$

$$HS^-+SO_4^-+2O_2 \rightarrow SO_4^{2-}+SO_2+O_2^-+H^+$$

$$SR^-+SO_4^-+2O_2^- \rightarrow SO_4^{2-}+SO_2+ROO\cdot$$

$$2SO_2+O_2+2H_2O \rightarrow 2SO_4^{2-}+4H^+$$

And the promotion that the $H_2O_2$ remaining in the step (A) or the $H_2O_2$ regenerated in the above-described reaction steps participates in the reaction:

$$SO_2+H_2O_2 \rightarrow SO_4^{2-}+2H^+$$

Additionally, through UV illumination, the aforementioned intermediate product $SO_2$ can be promoted to convert into a stable $SO_4^{2-}$ product, and contribute additional free radicals $SO_4^{2-}\cdot$ and $HO\cdot$ to add the degradation reaction of the sulfide and organic matter:

$$SO_2 + H_2O + O_2 \xrightarrow{h\nu} SO_4^\cdot + \cdot OH + H^+$$

In summary, the present disclosure of the method and system for simultaneously treating a high concentration of sulfide and organic composition contained in a waste liquid may directly carry out the stabilizing conversion operation and activation oxidation reaction, without the addition and adjustment of acid-base adjusters, buffers or other auxiliaries; and without the need for pretreatment or post-treatment such as filtration and coagulation precipitation. The oxidation reaction in the reaction tank is carried out by using a UV light to illuminate and activate oxidant, or a UV light to illuminate and activate the residual oxidant in the step (A), or an activation oxidation process of the addition of the above two, so as to achieve the purpose of sulfide conversion and degradation and removal of organic pollution composition, and can be used as a choice of collocation for future related plant applications, further close to the development trend of global zero emission in the future.

BRIEF DESCRIPTION OF THE DRAWINGS

FIG. 1 is a flowchart of a method for simultaneously treating a high concentration of sulfide and organic composition contained in a waste liquid of an embodiment of the present disclosure.

DETAILED DESCRIPTION OF THE INVENTION

Figure 2:
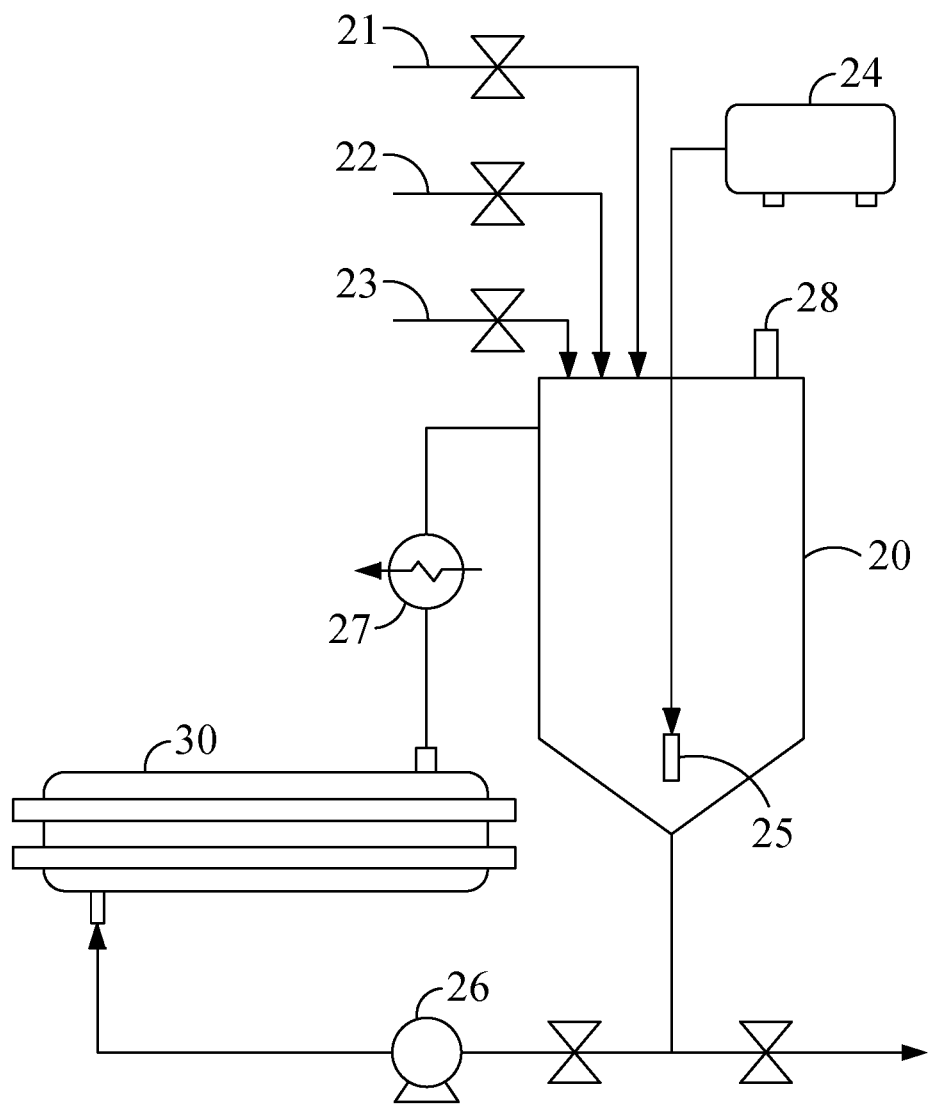
FIG. 2 is a schematic view of a system for simultaneously treating a high concentration of sulfide and organic composition contained in a waste liquid of an embodiment of the present disclosure.

First, referring to FIG. 1, FIG. 1 is a flowchart of a method for simultaneously treating a high concentration of sulfide and organic composition contained in a waste liquid (hereinafter referred to as the waste liquid treatment method) of an embodiment of the present disclosure. As shown in FIG. 1, the waste liquid treatment method of one embodiment of the present disclosure comprises at least steps (A)-(C), and may further comprise step (D). Further, in terms of waste liquid containing a high concentration of sulfide and organic composition, the sulfide comprises organic sulfides and inorganic sulfides, and a concentration of the sulfide may be 25000-35000 mg/L; wherein, the organic sulfide includes at least any one selected from the group consisting of thiols, thiophenols, thioethers, polysulfides, sulfones, cyclic sulfides, thio heterocyclic compounds, thioaldehydes, thioketones, and thiocarboxylic acids; the inorganic sulfide includes at least any one selected from the group consisting of NaHS, KHS, $Na_2S$, $K_2S$ and dissolved $H_2S$. At the same time, a concentration of the COD may be 25000-35000 mg/L.

In addition, in terms of sources of the waste liquid containing a high concentration of sulfide and organic composition, they may be at least any one selected from the following: petrochemical industry waste lye; oil refinery industry waste lye; pharmaceutical waste water containing sulfides, tanning waste water, aquaculture waste water, domestic sewage or soil groundwater. Among them, the waste liquid treatment method of the present disclosure is particularly suitable for the petrochemical industry waste lye and oil refinery industry waste lye.

Next, as to step (A), it is slowly adding a precursory oxidant or the precursory oxidant accompanied by aerating with oxygen-containing gas to a waste liquid containing a high concentration of sulfide and COD having a temperature of 25-70° C. at atmospheric pressure, and make it mixed thoroughly and evenly. Among them, the precursory oxidant may be hydrogen peroxide ($H_2O_2$) or sodium percarbonate ($Na_2CO_3 \cdot 2H_2O_2$, $2Na_2CO_3 \cdot 3H_2O_2$ or $Na_2CO_3 \cdot nH_2O_2 \cdot mH_2O$). By the precursory oxidant, the sulfide composition of the NaSR organic sulfides and inorganic sulfides, such as NaHS, $Na_2S$, and dissolved $H_2S$ in the waste liquid can perform stabilizing conversion of non-free radical reaction (i.e., the precursory stabilizing conversion) to be converted into sulfates ($SO_4^{2-}$). Further, in terms of the content of the precursory oxidant, in mg/L, a ratio of the precursory oxidant/the total amount of sulfide is 2.20 to 6.37.

Then, as to step (B), it is sufficiently mixing evenly an advanced oxidant and the waste liquid after treatment in the above step (A). Among them, the advanced oxidant is sodium persulfate ($Na_2S_2O_8$) or potassium persulfate ($K_2S_2O_8$). By the interaction of the advanced oxidant and the oxygen-containing gas (air or oxygen) and other mixed ingredients, and through a subsequent step (C), it may promote the continuous stabilizing conversion of the aforementioned sulfide composition while undergoing advanced degradation, resulting in the complete absence of $H_2S$ acid gas and other sulfides in the waste liquid treatment method. Further, in terms of the content of the advanced oxidant, in mg/L, a ratio of the advanced oxidant/COD after the above step (A) is 7.63 to 33.27.

Further, as to step (C), it is using UV illumination method to illuminate the oxidant dissolved in the waste liquid after the above step (B) or UV light to illuminate together with the residual hydrogen peroxide and/or sodium percarbonate in the waste liquid of the above step (A), the oxidant dissolved in the waste liquid is activated, and aerated with oxygen-containing gas. Herein, a wavelength range of UV light in the UV illumination method is between 180 nm and 365 nm. Further, in the step (C), the oxidant dissolved in the waste liquid after the step (B) is at least any one selected from the group consisting of the advanced oxidant (sodium persulfate or potassium persulfate) described in the step (B), the precursory oxidant (hydrogen peroxide or sodium percarbonate) remained in the step (A), and a mixture of the above two and oxygen-containing gas.

In addition, a treatment time of the step (A) is 0.5 to 1 hour; any treatment time of the step (B) is suitable, as long as it is sufficient to make the advanced oxidant and the waste liquid after the treatment of the above step (A) sufficiently and evenly mixed, and is not particularly limited, usually several minutes to several tens of minutes. A treatment time of the step (C) is 1.5 to 7 hours. Further, the step (C) is usually carried out at atmospheric pressure and a temperature of 30 to 40° C.

Further, the method of the present disclosure may further comprise step (D), which is recycling the waste liquid after the above steps (A) to (C) as a regenerative lye; or adjusting pH value of the waste liquid that has undergone the above step (C), so that it is connected to a biological treatment unit or discharged directly as an effluent. Specifically, it may be adjusted according to the pH value of the water body after the actual reaction of the treatment of the steps (A) to (C) and depending on the pH value allowable condition of the physical and biological treatment units of the plant where the subsequent confluence is to be connected; or after the COD of the waste liquid is treated in the steps (A) to (C) to achieve the discharge standard, it can be adjusted depending on the pH discharge standard value (usually 6 to 9) of the actual effluent; alternatively, if the waste liquid treated by the steps (A) to (C) can achieve the discharge standard and is still maintained at a high alkalinity (usually a pH value about 12), it may be directly recycled as a regenerative lye without pH value adjustment.

Further, referring to FIG. 2, FIG. 2 is a schematic view of a system for simultaneously treating a high concentration of sulfide and organic composition contained in a waste liquid (hereinafter referred to as the waste liquid treatment system) of an embodiment of the present disclosure. As shown in FIG. 2, the waste liquid treatment system 100 of one embodiment of the present disclosure comprises at least: a reaction tank 20, a photoactivation reaction unit 30 and an aeration unit 24, and further as necessary, may further comprise an internal circulation pump 26 and a heat exchange unit 27.

Further, as shown in FIG. 2, the reaction tank 20 may be communicated with a waste liquid source 21, a precursory oxidant source 22 and an advanced oxidant source 23. Further, the aeration unit 24 is connected with the reaction tank 20 in series, an aeration end 25 is inserted into the reaction tank 20 for aerating with oxygen-containing gas. Thus, it may first introduce the waste liquid and the precursory oxidant into the reaction tank 20 to perform the above step (A) (usually about half an hour); then the advanced oxidant is introduced into the reaction tank 20 to perform the above step (B).

Herein, a top of the reaction tank 20 may further be mounted with an exhaust port 28. This is because when the aeration unit 24 performs the aeration operation, the reaction tank 20 may accumulate pressure inside, so the exhaust port 28 may be used to discharge excess oxygen-containing gas.

Next, the photoactivation reaction unit 30 is connected with the reaction tank 20 in series, and receives the waste liquid that goes through the reaction tank 20, and by the aeration unit 24, the waste liquid within the photoactivation reaction unit 30 is performed with the above step (C). In a preferred embodiment, an inlet end of the photoactivation reaction unit 30 and an outlet end of the reaction tank 20 are provided with the internal circulation pump 26 therebetween, so that the waste liquid containing a high concentration of sulfide and organic component can be recycled and treated multiple times within the waste liquid treatment system 100.

Further, in a preferred embodiment, an outlet end of the photoactivation reaction unit 30 and an inlet end of the reaction tank 20 are provided with the heat exchange unit 27 therebetween, in order to control or maintain a temperature of the liquid at the outlet end of the photoactivation reaction unit 30 to a temperature suitable for entering the reaction tank 20 and performing the above step (A) or step (B).

The present disclosure will be further described below by means of embodiments and comparative embodiments, but the embodiments are only used for illustrative purposes and are not used to limit the present disclosure.

EMBODIMENTS

<Embodiment 1→$H_2O_2$ Plus UV is Applied to Photoactivate Persulfate (SPS)

The object treated with Embodiment 1 is a high concentration of sulfide organic waste lye produced by a naphtha cracking process of a petrochemical plant, the main composition of which includes NaOH, $Na_2CO_3$, NaHS, $Na_2S$, NaSR (organic sulfide), phenol, oil and polymer and the like; pH value thereof is about 13.69, the total sulfide content is 24150 mg/L and the total COD content is 29860 mg/L.

The above steps (A)-(C) are used to treat the waste liquid of Embodiment 1. In the step (A), hydrogen peroxide as a precursory oxidant/the total amount of sulfide=2.20 (the precursory oxidant is about 53571 mg/L that is approximately equal to 1575 mM), and the treatment of the (A) step is carried out under atmospheric pressure and a temperature of 25 to 70° C., and a treatment time is about half an hour.

Next, in the step (B), sodium persulfate as an advanced oxidant/COD after the above step (A)=14.42 (the oxidant is about 49320 mg/L that is approximately equal to 207 mM) are added to the waste liquid after the above step (A). After that, after starting the UV light source and waiting for the light source to be stabilized (about several minutes), the waste liquid after the above step (B) is introduced from the reaction tank into the photoactivation reaction unit, and the (C) step is carried out at atmospheric pressure and a temperature of 30 to 40° C. to carry out the continuous stabilization of the sulfide and the oxidative degradation reaction of COD.

Figure 3:
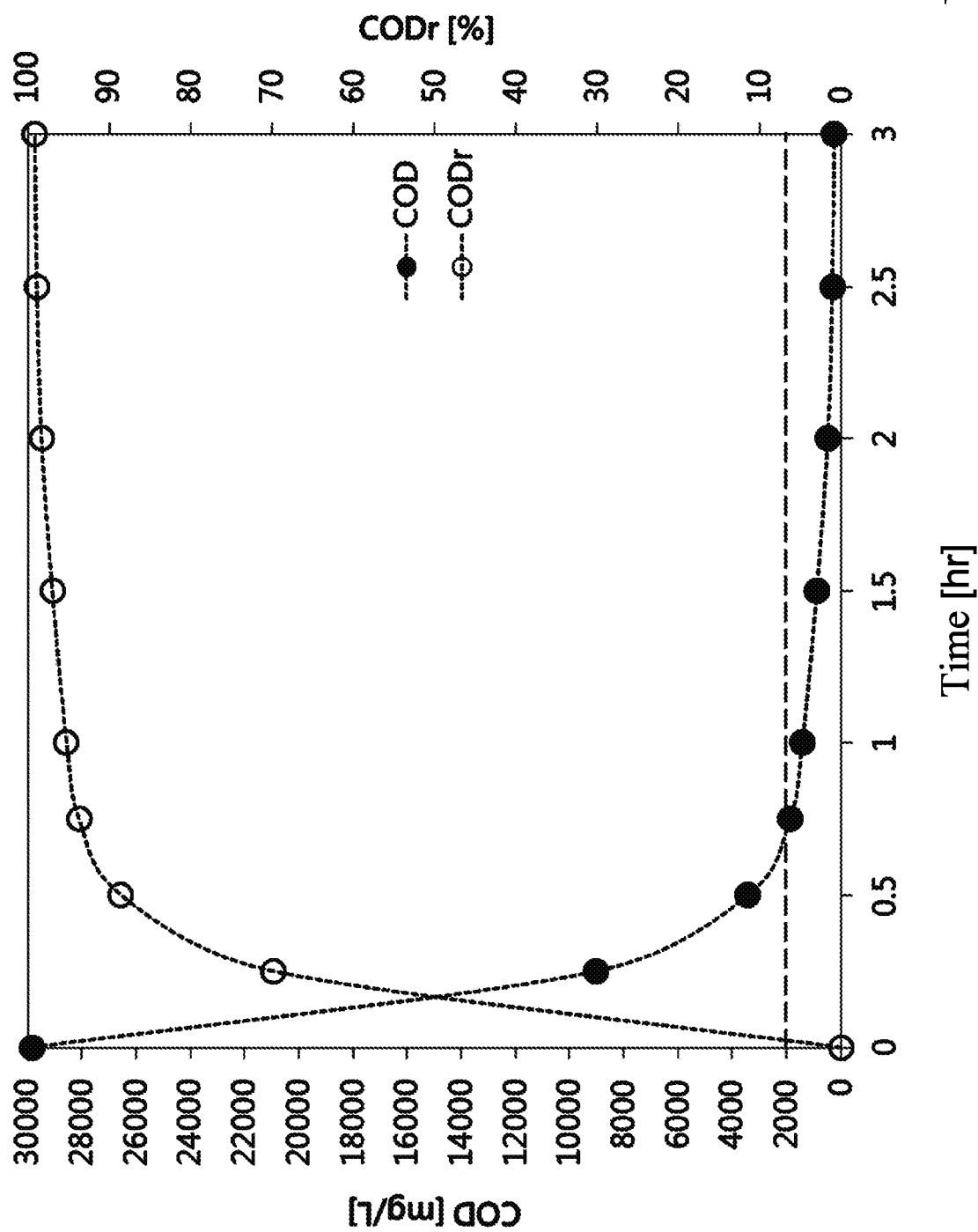
FIG. 3 is a relation graph of COD and COD removal rate in the aqueous phase to time of Embodiment 1 of the present disclosure.

The treatment results of Embodiment 1 are shown in FIG. 3, as can be seen from the results, the step (A) is completed in 0.5 hours (hr), at this time the pH value is about 12, during which the COD is greatly attenuated, from the initial 29860 mg/L to 3420 mg/L, and the original total amount of sulfide has been reduced from 24150 mg/L to 0 (no sulfide composition of the original waste lye is detected), it is almost completely removed.

Subsequently, through the step (B) and step (C), the COD can carry out the advanced oxidative degradation from 3420 mg/L at 0.5 hr to 250 mg/L at 3 hr (COD removal rate is as high as 99.16%). Among them, the step (C) is carried out at atmospheric pressure and a temperature of 30 to 40° C.

Figure 4:
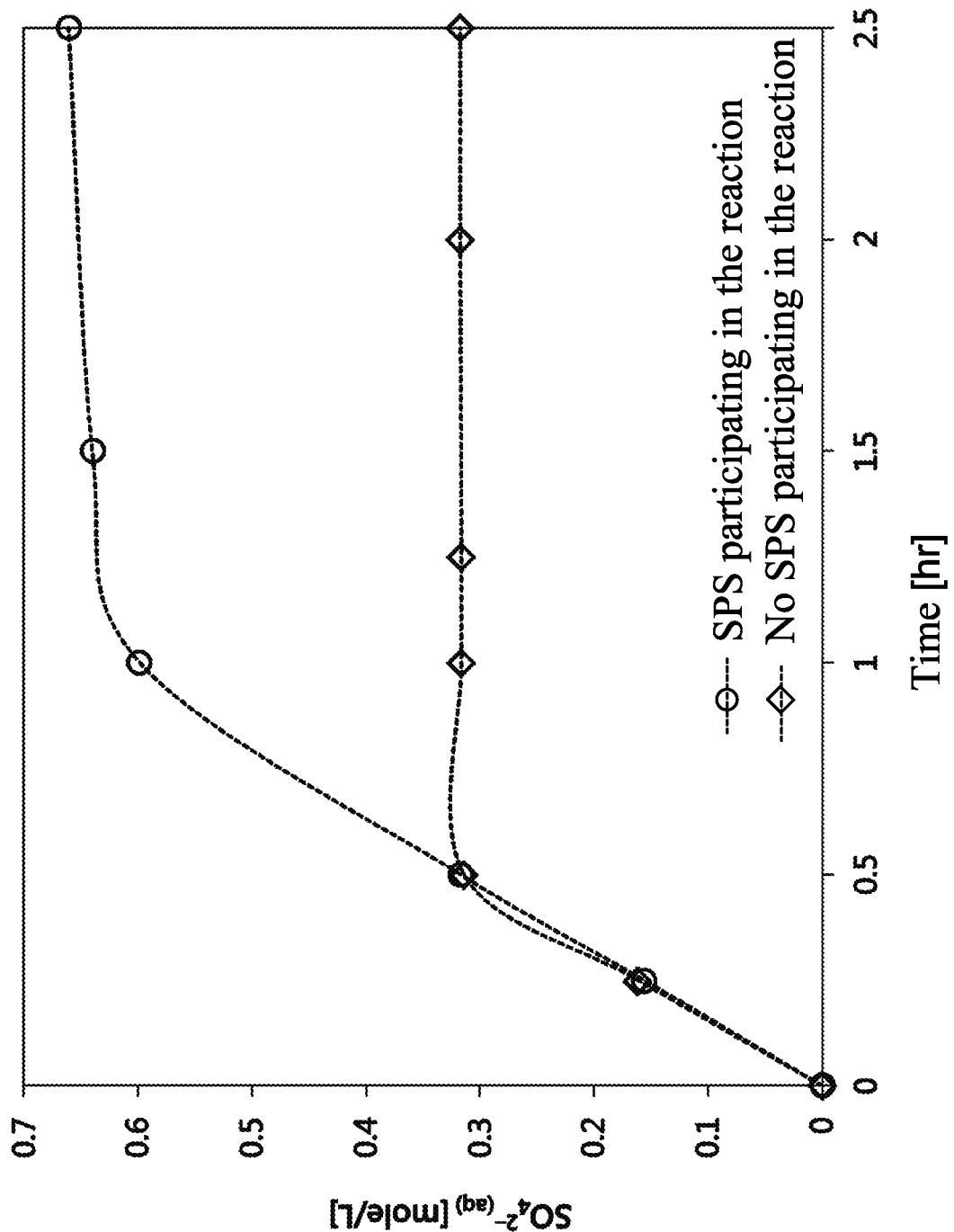
FIG. 4 is a relation graph of sulfate concentration in the aqueous phase to time of Embodiment 1 of the present disclosure.
Figure 5:
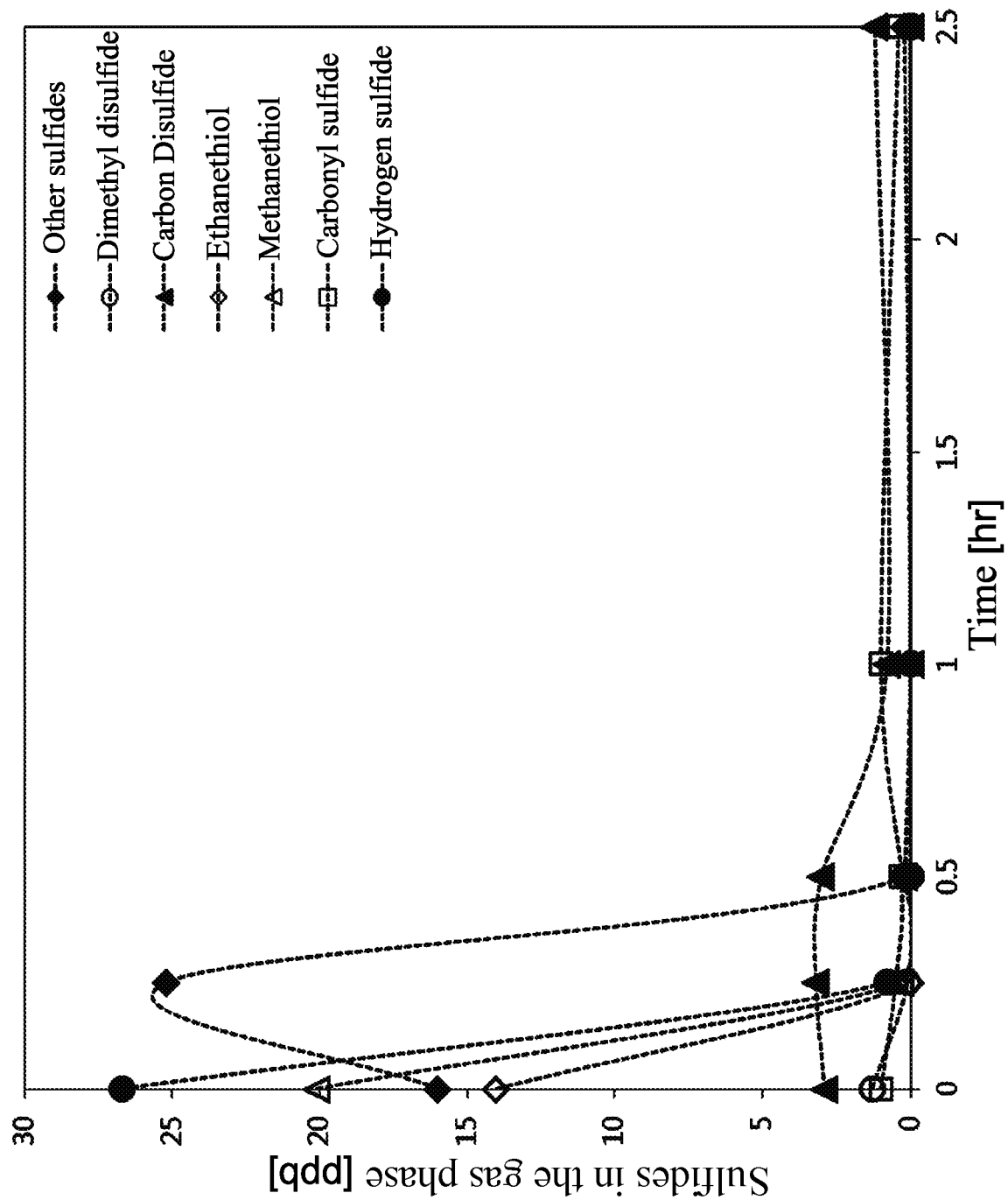
FIG. 5 is a relation graph of the concentration of each sulfide composition in the gas phase to time of Embodiment 1 of the present disclosure.

Further, in order to prove that all sulfide composition is indeed stabilized and converted into sulfate ($SO_4^{2-}$), and confirm that there is no hydrogen sulfide ($H_2S$) acid gas outflow during the treatment process, the present embodiment also synchronously monitors the growth trend of sulfate in the aqueous phase of the waste lye and the change in the composition of the tail gas (including the composition of $H_2S$ acid gas and other sulfides in the gas phase) before, during and after treatment, the results are shown in FIGS. 4 to 5.

As shown in FIG. 4, after the step (A) reacts for 0.5 hr, the sulfate in the water is increased from 0 to 0.314 mole/L (the stabilizing conversion reaction of the sulfide is more significantly than the COD degradation, so the sulfides in Embodiment 1 are eventually converted to sulfate, but the COD still remains in the end), and the reaction of step (A) is extended to 2.5 hr (i.e., the steps (B), and (C) are not performed, as the following comparative embodiment 1 that there is no persulfate participated in the reaction), at this time the sulfate is 0.317 mole/L, it is almost similar to the concentration at 0.5 hr. The result shows that under high alkalinity conditions (pH value>12), most of the sulfides can obtain effective stabilizing conversion through the step (A) (sulfate conversion rate is about 99.05%). In contrast, if the step (A) reacting for 0.5 hr is followed by the UV/SPS advanced oxidation process of the steps (B) and (C), the sulfate will continue to increase and the growth trend will be significantly slowed down after 1 hr, and the sulfate concentration in water after 2.5 hr will increase to about 0.661 mole/L.

The results of FIG. 4 show that compared with the result of carrying out the above-described step (A) only (i.e., the sulfate of 0.317 mole/L is produced), the result of carrying out the steps (A) to (C) increases an additional sulfate about 0.344 mole/L, it almost reaches the same content as the sulfate finally derived from the SPS put into Embodiment 1 (about 0.348 mole/L).

Further, FIG. 5 is a relation graph of the concentration of each sulfide composition in the gas phase to time of Embodiment 1 of the present disclosure, as shown in FIG. 5, the gas phase composition of the waste lye before treatment under high alkalinity conditions (pH value is about 13.69) can be determined by continuous GC-MS identification and GC analysis, measured about an extremely trace amount of $H_2S(g)$ of about 26.7 ppb, and the total amount of other sulfides in the gas phase included is only about 81.9 ppb. With the operation of the steps (A) to (C), the $H_2S(g)$ concentration in the gas phase composition can be reduced to 0.2 ppb, that is, the presence of $H_2S(g)$ cannot be detected at all after 0.5 hr; similarly, the other sulfides in the gas phase also have the same degradation trend, so that the total amount of sulfides treated for 2.5 hr is only about 1.8 ppb, it is proved that the whole treatment process of reaction is not only free of the generation of hydrogen sulfide acid gas, the present disclosure can also highly achieve to inhibit/further reduce the sulfide pollutants in the gas phase of the treatment process, but also conducive to promoting air pollution improvement.

Figure 6:
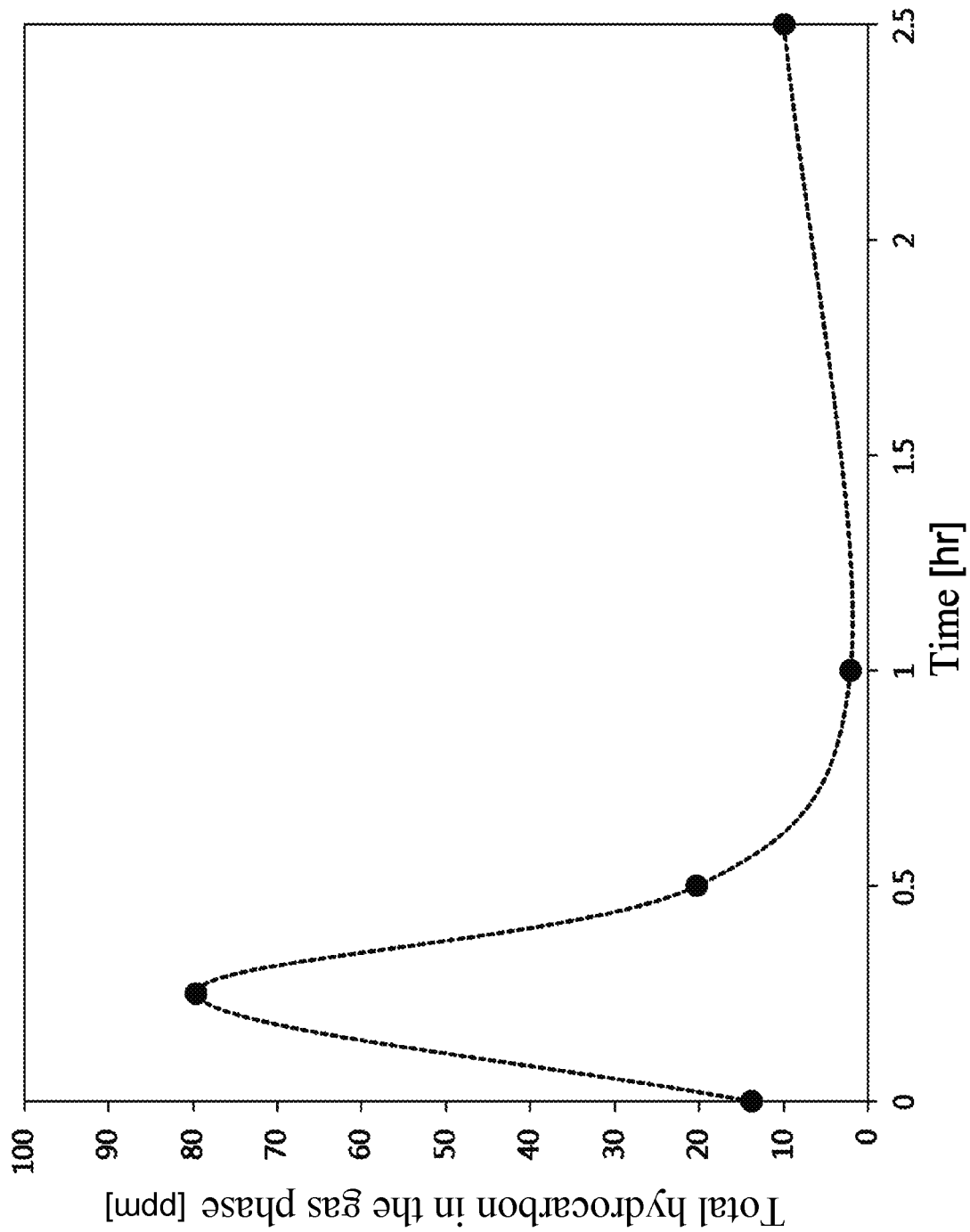
FIG. 6 is a relation graph of the total hydrocarbon concentration in the gas phase to time of Embodiment 1 of the present disclosure.

Further, the present embodiment also synchronously monitors the change relation on the total hydrocarbon concentration in the gas phase over time before, during and after the reaction of the steps (A) to (C), the results are collated in FIG. 6. As shown in FIG. 6, the total hydrocarbon of the gas phase during the treatment of Embodiment 1 does not exceed 80 ppm at most, and only about 10 ppm after treatment, which fully meets the entry conditions of any subsequent air pollution treatment units, and even has reached over the regulatory emission standards, and can be directly discharged. The results of Embodiment 1 show that the method of the present disclosure can be operated directly under the high alkaline operating conditions of pH value>13, not only can effectively convert and remove 24150 mg/L of sulfide (the composition of sulfide including hydrogen sulfide) completely (the overall sulfide removal rate is up to 100%), but also can simultaneously degrade 29610 mg/L of COD (the overall COD removal rate is as high as 99.16%); and the appearance before and after treatment has been significantly improved (dark yellow opacity before treatment, clear and transparent after treatment by sight).

<Comparative Embodiment 1→Only $H_2O_2$ is Applied

Figure 7:
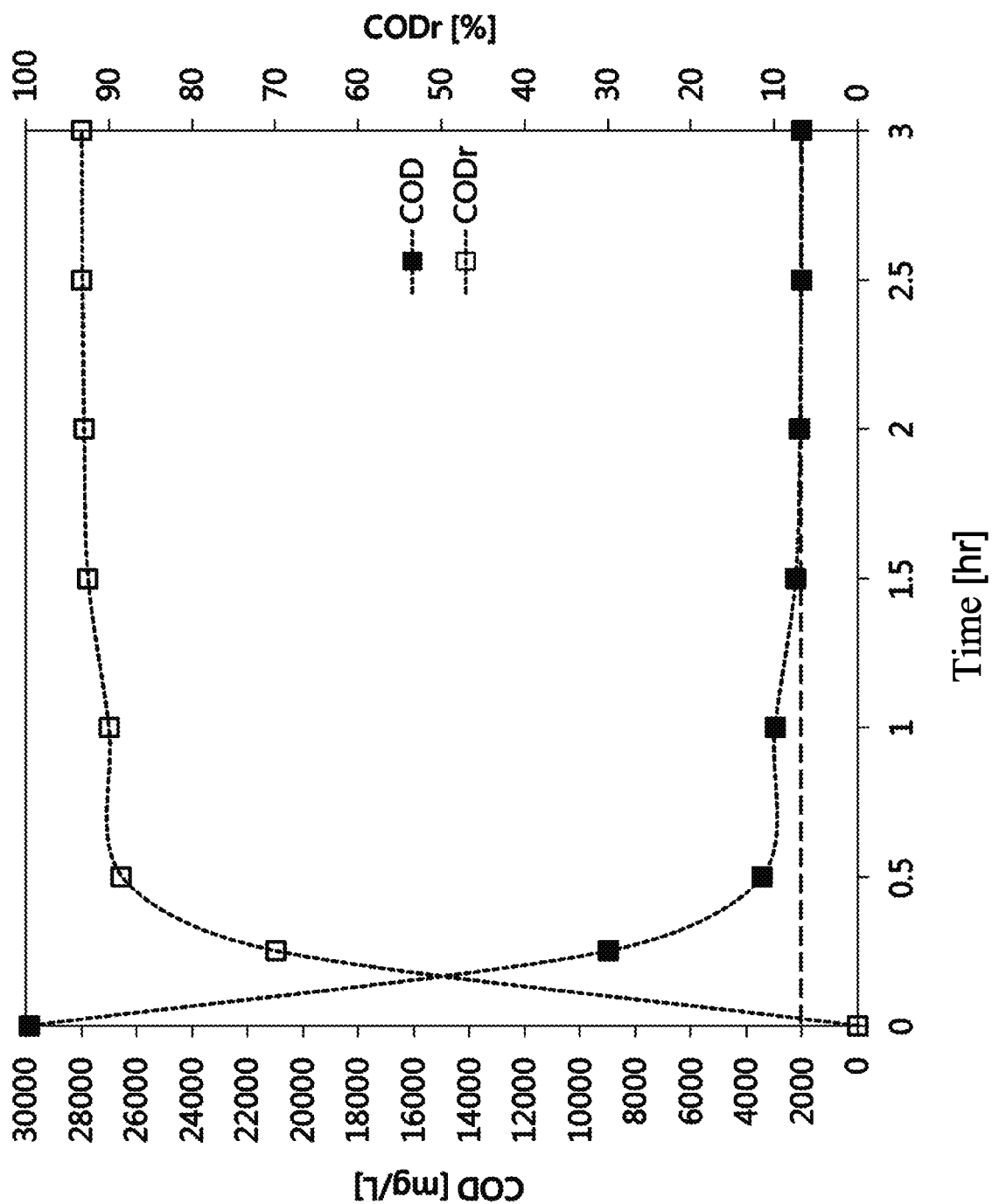
FIG. 7 is a relation graph of COD and COD removal rate in the aqueous phase to time of Comparative embodiment 1 of the present disclosure.

The waste liquid treated by Comparative embodiment 1 is the same as Embodiment 1. Comparative embodiment 1 extends the reaction of step (A) of Embodiment 1 to 3 hr, and fails to perform the steps (B) and (C). The results of Comparative embodiment 1 are shown in FIG. 7, the pH value is about 12 at 0.5 hr, during which the COD is greatly attenuated, reducing from the initial 29860 mg/L to 3435 mg/L, and the original total sulfide has been reduced from 24150 mg/L to 0, it is almost completely removed. The growth trend of sulfate conversion in water is the result of the reaction without SPS participation in FIG. 4 when the reaction time is extended to 2.5 hr.

Next, as shown in FIG. 7, when the reaction starts from 0.5 hr to 1.5 hr, the COD degradation shows obvious lag and slowdown, the degradation reaction reaches the limit at 1.5 hr, and the COD is remained constant about 2000 mg/L after 1.5 hr to 3 hr. It can be seen that although Comparative embodiment 1 can achieve the purpose of stabilizing and converting sulfides in the waste lye, the COD remains up to about 2000 mg/L in the end, and it cannot achieve the purpose of advanced oxidative degradation of the organic pollution composition at the same time.

<Comparative Embodiment 2→$H_2O_2$ Plus UV is Applied to Photoactivate $H_2O_2$

Figure 8:
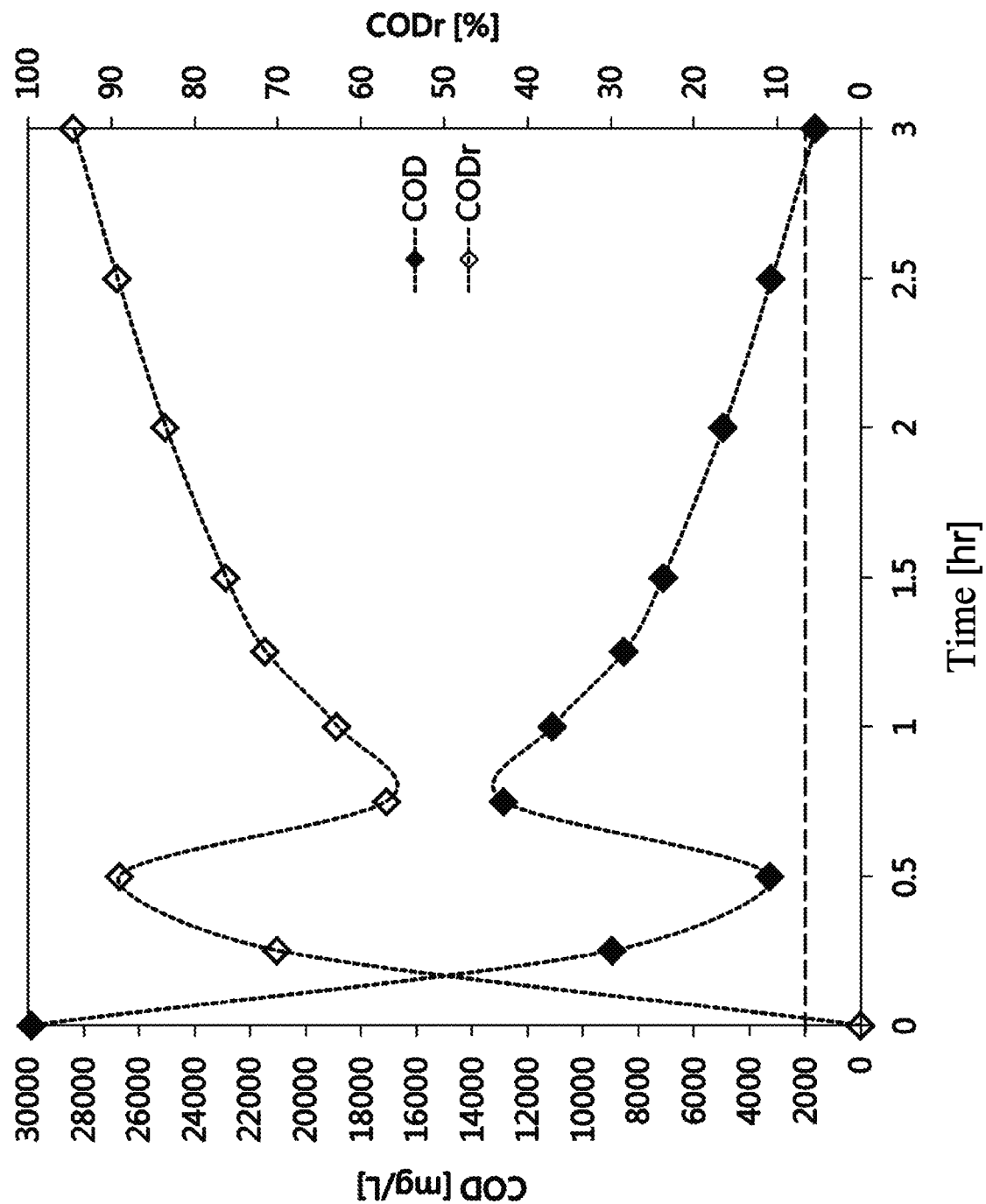
FIG. 8 is a relation graph of COD and COD removal rate in the aqueous phase to time of Comparative embodiment 2 of the present disclosure.

The waste liquid treated by Comparative embodiment 2 is the same as Embodiment 1. Comparative embodiment 2 performs the steps (A) to (C) of Embodiment 1, but the content of hydrogen peroxide in the step (A) of Embodiment 1 is adjusted to hydrogen peroxide/total sulfide=4.01 (the precursor oxidant is about 96774 mg/L that is approximately equal to 2845 mM), the persulfate (SPS) in the step (B) of Embodiment 1 is replaced with an additional addition of $H_2O_2$, the amount of which is added is $H_2O_2$/COD after the step (A)=9.216 (oxidant is about 57143 mg/L that is approximately equal to 1680 mM). After conversion, the total amount of hydrogen peroxide input in Comparative embodiment 2 is (total amount of hydrogen peroxide)/(total amount of sulfide)=6.37 (hydrogen peroxide is about 153917 mg/L that is approximately equal to 4525 mM). The results of Comparative embodiment 2 are shown in FIG. 8, the pH value is about 12 at 0.5 hr of the completion of the step (A), during which the COD is greatly attenuated, reducing from the initial 29860 mg/L to 3275 mg/L, and the original total amount of sulfide has been reduced from 24150 mg/L to 0, it is almost completely removed. It can be seen that when the hydrogen peroxide content in the step (A) of Embodiment 1 is adjusted to hydrogen peroxide/total amount of sulfide as 4.01 to 6.37, it also has excellent removal effect of sulfide and COD. However, although the reaction time of the steps (B) and (C) of Comparative embodiment 2 is extended to 2.5 hr, the growth trend of sulfate conversion in water is the same as that of the reaction without SPS participation in FIG. 4, and the content of sulfate is not increased.

Further, as shown in FIG. 8, when the reaction time of the steps (B) and (C) of Comparative embodiment 2 starts from 0.5 hr to 0.75 hr, the COD fails to drop but rises, reaching a maximum value about 12860 mg/L at 0.75 hr, which means that during the period of 0.5 hr to 0.75 hr, $H_2O_2$ is poorly activated by UV photoactivation, resulting in a high residual amount of $H_2O_2$ and contributing a considerable COD value. Subsequently, during the reaction after 0.75 hr to 3 hr, the COD gradually decreased to about 1635 mg/L. It can be seen that although Comparative embodiment 2 can reduce the residual amount of COD compared with Comparative Embodiment 1, it is still unable to achieve the effect of advanced oxidative degradation of Embodiment 1.

<Embodiments 2 to 3→

In addition to respectively changing the ratio of sodium persulfate in the step (B)/COD after the above step (A) of Embodiment 1 to 7.63 (the oxidant is about 24660 mg/L that is approximately equal to 103 mM) and 33.27 (the oxidant is about 98640 mg/L that is approximately equal to 414 mM), other conditions are the same as Embodiment 1 to respectively complete Embodiments 2 to 3. The results of Embodiments 1 to 3 are collated in FIG. 9.

Figure 9:
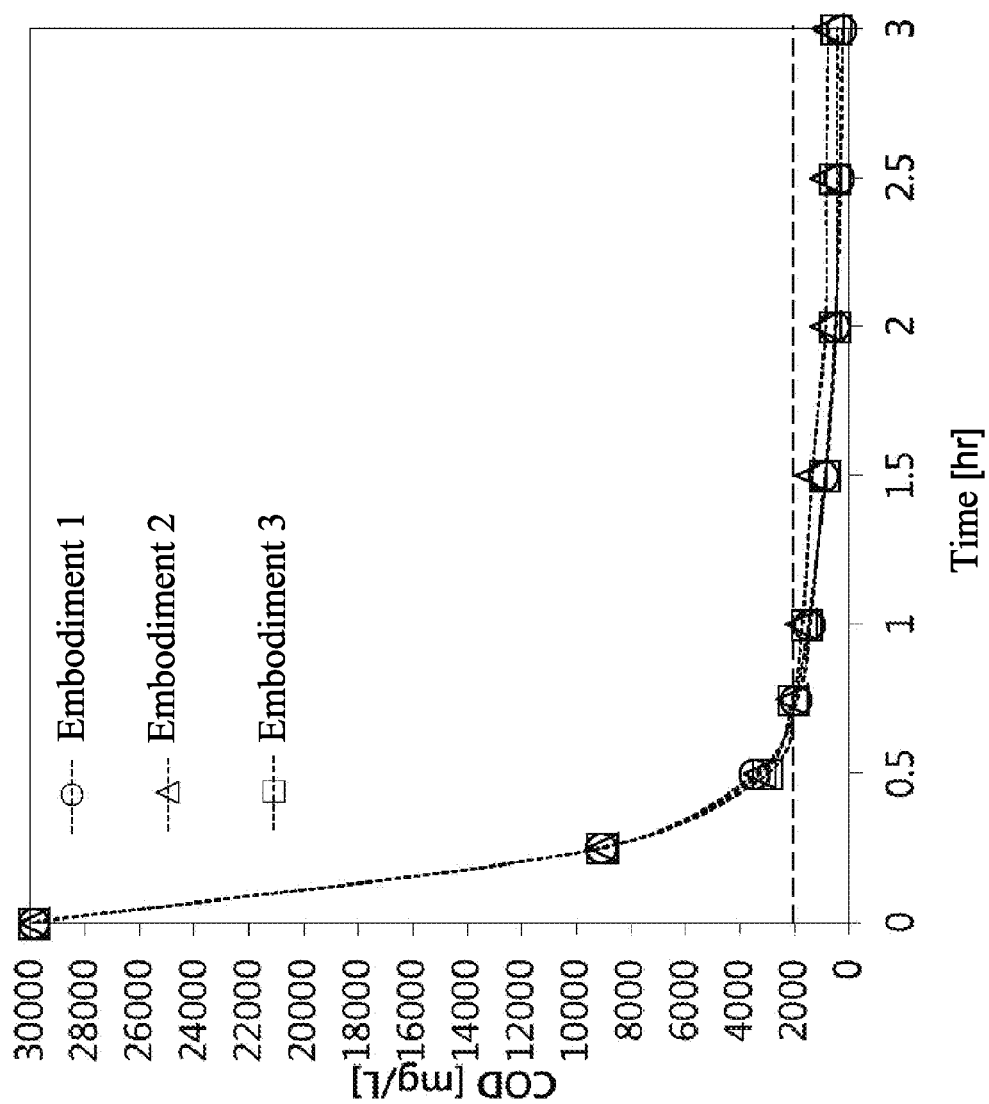
FIG. 9 is a relation graph of COD in the aqueous phase to time of Embodiments 1-3 of the present disclosure.

As shown in FIG. 9, in Embodiments 1 to 3, after the operation of the step (A), CODs are reduced from the initial 29860 mg/L to about 3420 mg/L, and the original total amount of sulfides have been reduced from 24150 mg/L to 0 to achieve the purpose of complete removal. Further, the successive steps (B) and (C) in Embodiments 1 to 3 can also make the CODs become about 3420 mg/L at 0.5 hr, and achieve the effect of advanced oxidative degradation. Subsequently, when the CODs are continuous to decrease to 3 hr, they are 250 mg/L (COD removal rate is as high as 99.16%), 769 mg/L (COD removal rate is as high as 97.42%), and 422 mg/L (COD removal rate is as high as 98.59%).

Next, from Embodiments 1 to 3, it can be known that under the conditions that the ratio of sodium persulfate/COD after the above step (A) is 7.63 (Embodiment 2) that is relatively small, and the ratio is 33.27 (Embodiment 3) that is relatively large, the difference in the effect of the present disclosure is not large, i.e., it is not true that the larger the ratio is, the higher the COD removal rate is. Further, under the condition of the ratio of 14.421 (Embodiment 1), the most preferable COD removal rate (up to 99.16%) is obtained. Therefore, the ratio of the advanced oxidant/COD after the above step (A) is preferably 7.63 to 33.27.

<Controlled Embodiment 1→

The waste liquid treated by Controlled embodiment 1 is the same as Embodiment 1. Controlled embodiment 1 first performs sulfur removal by acidification for the waste liquid, and then performs the steps (B) to (C) of Embodiment 1, wherein the advanced oxidant/COD after the sulfur removal by acidification=9.42. Further, after the step (C) reacts for 3 hr, Controlled embodiment 1 can obtain a result of a COD removal rate about 90.10%. However, in Controlled embodiment 1, in addition to the COD removal rate that is lower than 97.42% to 99.16% of Embodiments 1 to 3, because the sulfur removal by acidification converts the sulfide in the waste liquid into $H_2S$ acid gas, it is still necessary to carry out additional treatment for $H_2S$ acid gas, and thus it is not preferable.

<Controlled Embodiment 2→

The waste liquid treated by Controlled embodiment 2 is the same as Embodiment 1. Controlled embodiment 2 first performs sulfur removal by WAO for the waste liquid, and then performs the steps (B) to (C) of Embodiment 1, wherein the advanced oxidant/COD after the sulfur removal by WAO=12.66. Further, after the step (C) reacts for 4.5 hr, Controlled embodiment 2 can obtain a result of a COD removal rate about 93.02%. However, in Controlled embodiment 2, in addition to the COD removal rate that is lower than 97.42% to 99.16% of Embodiments 1 to 3, because of the high cost of the WAO method, it is not preferable.

Further, although the waste liquid treatment method of the present disclosure may be directly carried out the steps (A) to (C) without pretreatment, the waste liquid treatment method of the present disclosure may also be applied after pretreatment (e.g., sulfur removal by acidification in Controlled embodiment 1 or sulfur removal by WAO in Controlled embodiment 2), as a choice of collocation when applied to the factory.

The present disclosure is not limited to the above embodiments, various changes may be made within the scope of claims, and embodiments obtained by the appropriate combination of the technical means disclosed in the different embodiments are also included within the technical scope of the present disclosure.

What is claimed is:

1. A method for simultaneously treating sulfide and organic composition contained in a waste liquid, comprising:
   (A) step of sulfur removal by precursory stabilizing conversion under the operating conditions of pH value >12, it is adding a precursory oxidant or the precursory oxidant accompanied by aerating with oxygen-containing gas to a waste liquid containing sulfide and COD having a temperature of 25-70° C., and make it mixed thoroughly and evenly; wherein, the precursory oxidant is hydrogen peroxide or sodium percarbonate, and in mg/L, a ratio of the precursory oxidant/the total amount of sulfide is 2.20 to 6.37;
   (B) step of sulfur removal by advanced oxidative degradation, it is sufficiently mixing evenly an advanced oxidant and the waste liquid after treatment in the above step (A); wherein, the advanced oxidant is sodium persulfate or potassium persulfate, and in mg/L, a ratio of the advanced oxidant/COD after the above step (A) is 7.63 to 33.27;
   (C) step of UV illumination, it is using UV illumination method to illuminate the oxidant dissolved in the waste liquid after the above step (B) or UV light to illuminate together with the residual hydrogen peroxide and/or sodium percarbonate in the waste liquid of the above step (A), the oxidant dissolved in the waste liquid is activated, and aerated with oxygen-containing gas.

2. The method for simultaneously treating sulfide and organic composition contained in a waste liquid according to claim 1, further comprising:
   (D) step of post-treatment, it is recycling the waste liquid after the above steps (A) to (C) as a regenerative lye; or adjusting pH value of the waste liquid that has undergone the above step (C), so that it is connected to a biological treatment unit or discharged directly as an effluent.

3. The method for simultaneously treating sulfide and organic composition contained in a waste liquid according to claim 1, wherein the sulfide comprises organic sulfides and inorganic sulfides, and the organic sulfide includes at least any one selected from the group consisting of thiols, thiophenols, thioethers, polysulfides, sulfones, cyclic sulfides, thio heterocyclic compounds, thioaldehydes, thioketones, and thiocarboxylic acids; the inorganic sulfide includes at least any one selected from the group consisting of NaHS, KHS, $Na_2S$, $K_2S$ and dissolved $H_2S$.

4. The method for simultaneously treating sulfide and organic composition contained in a waste liquid according to claim 1, wherein in the step (C), the oxidant dissolved in the waste liquid after the step (B) is at least any one selected from the group consisting of sodium persulfate or potassium persulfate described in the step (B), hydrogen peroxide or sodium percarbonate remained in the step (A), and a mixture of the above two and oxygen-containing gas.

5. The method for simultaneously treating sulfide and organic composition contained in a waste liquid according to claim 1, wherein in the step (C), a wavelength range of UV light in the UV illumination method is between 180 nm and 365 nm.

6. The method for simultaneously treating sulfide and organic composition contained in a waste liquid according to claim 1, wherein a treatment time of the step (A) is 0.5 to 1 hour; a treatment time of the step (C) is 1.5 to 7 hours.

7. The method for simultaneously treating sulfide and organic composition contained in a waste liquid according to claim 1, wherein a concentration of the sulfide is 20000-35000 mg/L; and a concentration of the COD is 25000-35000 mg/L.

8. The method for simultaneously treating sulfide and organic composition contained in a waste liquid according to claim 1, wherein the waste liquid containing sulfide and COD is at least any one selected from the following: petrochemical industry waste lye; oil refinery industry waste lye; pharmaceutical waste water containing sulfides, tanning waste water, aquaculture waste water, domestic sewage or soil groundwater.

* * * * *